(12) United States Patent
Jacob et al.

(10) Patent No.: US 6,800,338 B2
(45) Date of Patent: Oct. 5, 2004

(54) ELECTRO-OPTICAL LIQUID-CRYSTAL DISPLAY

(75) Inventors: Thomas Jacob, Modautal (DE); Juliane Suermann, Darmstadt (DE)

(73) Assignee: Merck Patentgesellschaft, Darmstadt (DE)

( * ) Notice: Subject to any disclaimer, the term of this patent is extended or adjusted under 35 U.S.C. 154(b) by 197 days.

(21) Appl. No.: 09/834,762

(22) Filed: Apr. 16, 2001

(65) Prior Publication Data

US 2002/0086120 A1 Jul. 4, 2002

(30) Foreign Application Priority Data

Apr. 14, 2000 (DE) .......................................... 100 18 882

(51) Int. Cl.[7] .................. C09K 19/34; C09K 19/20; C09K 19/30; G02F 1/1333
(52) U.S. Cl. .................. 428/1.3; 428/1.25; 252/299.61; 252/299.63; 252/299.67; 349/134; 349/136; 349/179; 349/180
(58) Field of Search ................................ 428/1.25, 1.3, 428/1.26, 1.1; 252/299.61, 299.63, 299.67, 299.01; 349/134, 136, 179, 180

(56) References Cited

U.S. PATENT DOCUMENTS

| | | | | |
|---|---|---|---|---|
| 4,974,940 | A | * 12/1990 | Asano et al. ................ | 349/101 |
| 5,054,889 | A | * 10/1991 | Imanishi et al. ............ | 349/123 |
| 5,188,758 | A | *  2/1993 | Baur et al. ............. | 252/299.01 |
| 5,520,845 | A | *  5/1996 | Auman et al. ........... | 252/299.4 |
| 5,578,241 | A | * 11/1996 | Plach et al. ............ | 252/299.01 |
| 6,016,179 | A | 1/2000 | Fukumoto et al. | |
| 6,067,139 | A | 5/2000 | Bohm et al. | |
| 6,139,926 | A | * 10/2000 | Auman et al. ............. | 428/1.26 |

FOREIGN PATENT DOCUMENTS

| | | |
|---|---|---|
| DE | 41 00 276 | 7/1991 |
| EP | 0 884 625 | 12/1998 |

* cited by examiner

*Primary Examiner*—Shean C. Wu
(74) *Attorney, Agent, or Firm*—Millen, White, Zelano & Branigan, P.C.

(57) ABSTRACT

To provide an electro-optical liquid-crystal displays with low addressing voltages and low to moderate multiplex ratios, in particular STN displays, organic alignment layers of low layer thickness are utilized.

32 Claims, No Drawings

ELECTRO-OPTICAL LIQUID-CRYSTAL DISPLAY

The present invention relates to electro-optical liquid-crystalline displays, in particular STN displays having low addressing voltages.

In liquid-crystal displays of this type, the liquid crystals are used as dielectrics whose optical properties change reversibly on application of an electric voltage. Electro-optical displays which use liquid crystals as media are known to the person skilled in the art. These liquid-crystal displays use various electro-optical effects. The most common of these are the TN effect (twisted nematic, having a homogeneous, virtually planar initial alignment of the liquid crystals and a nematic structure which is twisted by about 90°) and the STN effect (supertwisted nematic) and the SBE effect (supertwisted birefringence effect). In these and similar electro-optical effects, liquid-crystalline media of positive dielectric anisotropy ($\Delta\epsilon$) are used.

In STN displays, which, in the present application, include all common and known types of display with relatively high twist, such as, for example, SBE (supertwisted birefringent effect), GH (guest/host), STN and OMI (optical mode interference) displays, as well as compensated STN displays, such as DSTN (double layer STN) and film-compensated STN displays, the liquid-crystal director is twisted from one side of the liquid-crystal layer to the other by a given angle of from greater than 90°, typically of 180° or more, up to 600°, typically up to 270°. This is achieved on the one hand by corresponding alignment of the preferential directions of the liquid-crystal alignment of the two substrates to one another. The preferential direction of the alignment on the substrates is achieved by an anisotropic pretreatment, typically by rubbing a special, usually polymeric organic layer in one direction, or by vapour-deposition of $SiO_x$ at an angle. On the other hand, a chiral liquid-crystal medium is employed which consists of mesogenic chiral substances or, most widespread, consists of a non-chiral medium to which a chiral substance (a so-called dopant) is added. The latter alternative is usually preferred since, through variation of the concentration of the dopant, it enables the twist of the liquid-crystal layer to be set to virtually any desired values. It must be ensured here that the ratio of the layer thickness of the liquid-crystal layer (d) to the cholesteric pitch of the liquid-crystal (P) is sufficiently great in order to produce the desired twist. To this end, a twist value of more than 90° (or d/P=90°/360°=0.25) below the desired twist is generally set. This so-called geometrical limit is thus, for example, 0.5–0.25=0.25 for cells having a twist of 180° and 0.667–0.25=0.417 for a cell having a twist of 240°. The upper geometrical limit is in each case at a twist which is 180° higher, i.e. at a d/P value which is 0.5 higher. On application of an electric voltage, however, the cholesteric pitch increases, and thus the lower limit of the d/P ratio increases. Although the same effect can also occur at the upper limit, this is virtually impossible to utilize since an undesired electro-optical effect in the form of a refractive-index grid, the so-called striped transition, perpendicular to the director orientation in the centre of a liquid-crystal layer occurs on application of an electric voltage in the region of relatively high doping. This effect significantly reduces the upper limit of possible doping and is usually, in particular in the case of relatively high twist angles, much more pronounced than the increase in the lower limit on application of the voltage.

For fault-free operation of STN displays, however, a uniform transition of the liquid-crystal layer from the initial alignment to the final alignment, if possible over the entire display area, but at least over a pixel, is required. During this transition, the director of the liquid-crystal layer within each imaginary parallel sub-layer, irrespective of the location, moves toward one another in the same direction and at the same angle. This transition is also known as the Freedericks transition. However, this desired transition does not occur for all possible parameter combinations. Depending both on the properties of the liquid crystal and on the design of the display, an undesired transition known, owing to its optical appearance, as striped domain transition/distortion, occurs on application of an electric voltage. This transition takes precedence over the desired Freedericks transition if the liquid-crystal parameters, in particular the elastic constants and the dielectric anisotropy, are favorable for a steep electro-optical characteristic line. It is furthermore favored by a large d/P ratio and depends not least on the twist angle used and the surface tilt angle. The larger the twist angle, the greater the surface tilt angle has to be in order to enable stable operation of the display. Tilt angles of at least 2°, 3° or 4 to 5° are typically used at the twist angles of 180°, 220° and 240° that are generally frequently used.

Since the operating voltage in displays, i.e. also in displays with these effects, should generally be as low as possible, use is made of liquid-crystal media of high dielectric anisotropy, which generally consist predominantly and usually even very substantially of liquid-crystal compounds having the corresponding dielectric anisotropy, i.e. compounds of positive dielectric anisotropy in the case of dielectrically positive media. If need be, significant amounts of dielectrically neutral liquid-crystal compounds are typically employed. Liquid-crystal compounds with the sign of the dielectric anisotropy opposite to the dielectric anisotropy of the medium are generally employed extremely sparingly or not at all.

An exception is formed here by STN displays, which are also the subject-matter of the present application. In STN displays, dielectrically positive liquid-crystal media which comprise dielectrically negative liquid-crystal compounds can be employed, for example in accordance with DE 41 00 287, in order to increase the steepness of the electro-optical characteristic line.

The pixels of the liquid-crystal displays can be addressed directly, time-sequentially, i.e. in time multiplex mode, or by means of a matrix of active, electrically nonlinear elements.

In STN displays, addressing in time multiplex mode is the most wide-spread. In this mode, the columns and rows of a matrix-form arrangement of liquid-crystal switching elements are addressed by means of an Alt and Pleschko addressing scheme. In this case, the liquid-crystal medium of the liquid-crystal display elements reacts to the root mean square (rms) of the addressing voltage. Particularly at relatively high multiplex ratios and in the case of very fast-switching liquid-crystal switching elements, however, this no longer applies. The addressing here can alternatively be carried out by "multiple line addressing", by means of "active addressing" or the so-called "improved Alt-Pleshko addressing".

The term "low multiplex drive" is commonly used for multiplex ratios of 1:32 or less, the term "mid multiplex drive" is commonly used for multiplex ratios in the range from about 1:48 to 1:100, and the term "high multiplex drive" is commonly used for multiplex ratios of about 1:128 or more (for example 1:240, 1:400 or 1:480).

The steepness of the electro-optical characteristic line of the liquid-crystal cell must be sufficiently large (the numerical value $V_{90}/V_{10}$ must be correspondingly small) in order to be able to address the requisite number of rows. This also applies in the case of liquid-crystal displays having low addressing voltages. In these, however, the possible variations of the liquid-crystal medium are subject to relatively narrow limits. On the one hand, a large proportion of highly dielectrically positive compounds is required in order to achieve the requisite low threshold voltages. This results in a large proportion of the constituents of the medium being prespecified by substances which do not result in the best steepness of the characteristic line and at the same time restrict the latitude for use of compounds having corresponding elastic constants and makes the use of dielectrically negative compounds virtually impossible. In view of the fact that the liquid-crystal displays must have an adequate working temperature range and short response times, the choice of possible compounds is greatly restricted even for the remaining constituents of the liquid-crystal media.

It can thus be seen that there is a demand for liquid-crystal displays having an adequate working temperature range and short response times, in particular at low operating voltages and sufficiently great steepness of the electro-optical characteristic line.

Surprisingly, it has now been found that this can be achieved by the use of a corresponding liquid-crystal medium having an optimized alignment layer.

The most important parameters of the alignment layer are its dielectric constant, its surface energy and its layer thickness. In addition, its refractive index, its transparency and its color also have to be taken into account.

The alignment layers used are generally, and also in accordance with the present invention, rubbed organic layers, in particular polyimides. For STN displays, which are the subject-matter of the present invention, use is frequently preferably made of polyamidic acids, which are not imidated until they are on the substrate.

Preference is given to organic alignment layers and particularly preferably polyimides. In accordance with the present application, preference is given to the thinnest possible alignment layers. Alignment layers (ALs) having a layer thickness (d(AL)) in the range from 5 nm to 100 nm, particularly in the range from 7 nm to 80 nm, very particularly preferably in the range from 8 nm to 60 nm, and especially preferably in the range from 10nm to 25 nm, are typically used.

The upper limit for the layer thickness of the alignment layer is determined, in particular, by the desired steepness. The lower the layer thickness of a given alignment layer for a given liquid-crystal medium, the smaller is also the steepness of the electro-optical characteristic line.

The lower limit of the layer thickness of the alignment layer is determined by the applicational properties. Thus, generation of the requisite preferential direction by rubbing is no longer possible in the case of very thin layers. Various defects may occur individually or together. The most typical defects are inadequate or nonuniform alignment or the occurrence of small holes, known as pinholes, in the alignment layer.

Alignment layers which can be used in accordance with the present invention are the usual commercial polyimides. Examples which may be mentioned here are SE 150, SE 3140 and SE 4110 from Nissan Chemicals, Japan, SN-7100, SN-7200 and SN-7300 from HDM (Hitachi-DuPont Microsystems), Japan, and polyimides from Japan Synthetic Rubber, Japan.

A significant effect on the results is exerted by the dielectric constant of the alignment layer used. The dielectric constant of the polyimide SE 3140 is, for example, 3.0 and that of SE 150 is 2.9.

Suitable for use in displays according to the invention are, in particular, liquid-crystal media of high dielectric anisotropy and with a relatively broad operating- and storage-temperature range. Thus, the shelf life at $-30°$ C. in liquid-crystal cells having a liquid-crystal layer thickness which is suitable for the requisite optical retardation is preferably greater than or equal to 500 hours and particularly preferably greater than or equal to 1000 hours. Very particular preference is given to liquid-crystal media whose shelf life at $-40°$ C. is 1000 hours or more.

Preference is given to liquid-crystal media which comprise one or more compound(s) of the formula I

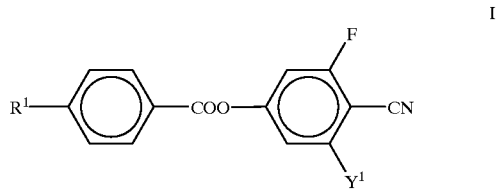

in which $R^1$ is alkyl or alkoxy having 1 to 7 carbon atoms or alkoxyalkyl, alkenyl or alkenyloxy having 2 to 7 carbon atoms, preferably alkyl or alkoxyalkyl, and $Y^1$ is H or F, preferably H.

In a preferred embodiment, the liquid-crystal media employed in accordance with the present invention comprise a) one or more highly dielectrically positive compound(s) of the formula (I)

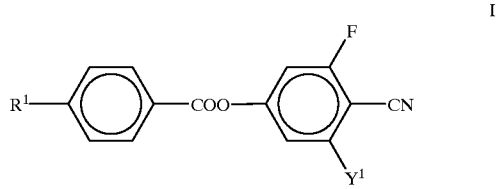

in which $R^1$ is alkyl or alkoxy having 1 to 7 carbon atoms, preferably n-alkyl or n-alkoxy, particularly preferably having 2 to 5 carbon atoms, or alkoxyalkyl, alkenyl or alkenyloxy having 2 to 7 carbon atoms, preferably 1E-alkenyl, 1-alkenyloxy or straight-chain alkoxyalkyl, preferably having 2 to 5 carbon atoms, and particularly preferably alkyl or alkoxyalkyl, and $Y^1$ is H or F, preferably H, and/or b) one or more dielectrically positive compound(s) of the formula II

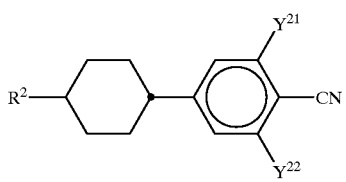

II in which
R², Y²¹ and Y²² are as defined above under the formula I for R¹ and Y¹ respectively, and Y²¹ and Y²² are preferably both H or both F,
and/or, preferably and
c) one or more dielectrically neutral compound(s) of the formula III

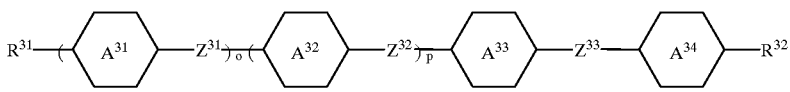

III in which
R³¹ and R³² are each, independently of one another, as defined above under the formula I for R¹, and
Z³¹, Z³² and Z³³ are each, independently of one another, —CH₂CH₂—, —CH=CH—, —COO— or a single bond,

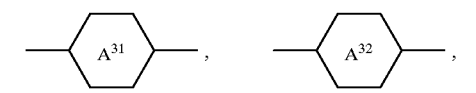

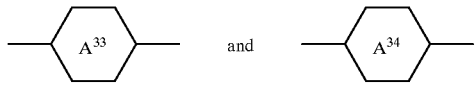

are each, independently of one another,

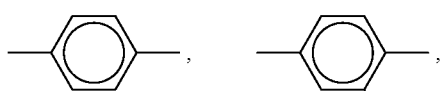

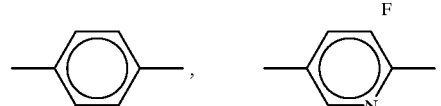

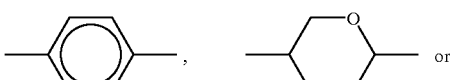

, and

o and p, independently of one another, are 0 or 1,
but preferably
R³¹ and R³² are each, independently of one another, alkyl or alkoxy having 1–5 carbon atoms or alkenyl having 2–5 carbon atoms,

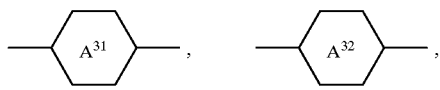

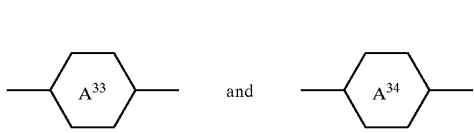

-continued are each, independently of one another,

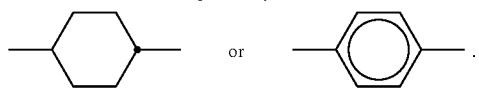

and very particularly preferably at least two or these rings are

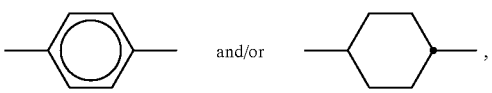

where very particularly preferably two adjacent rings are linked directly, preferably 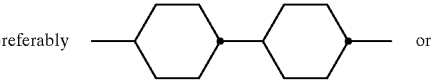 or

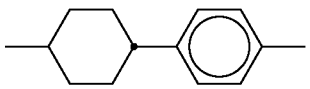

Preferably, the media contain one or more compounds selected from the group of compounds a) (Formula I) and b) (Formula II) and optionally one or more of compounds c) (Formula III). Further, the media preferably contain one or more compounds selected from a) or b) and one or more compounds of c), most preferably they contain one or more compounds of each of a), b) and c).

In a further preferred embodiment, the liquid-crystal medium employed additionally comprises one or more compound(s) of the formula IV

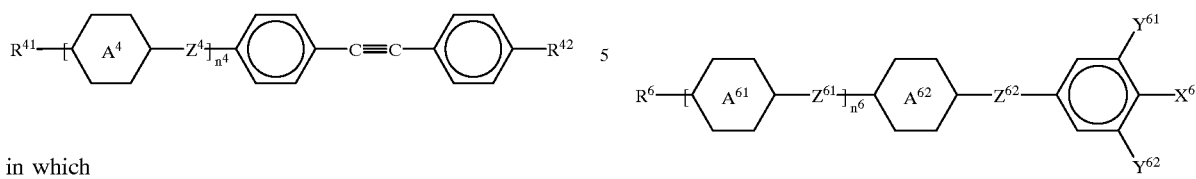

IV in which $R^{41}$ and $R^{42}$ are each, independently of one another, alkyl or alkoxy having 1 to 7 carbon atoms, preferably n-alkyl or n-alkoxy, preferably having 1 to 5 carbon atoms, or alkoxyalkyl, alkenyl, alkenyloxy or alkynyl having 2 to 7 carbon atoms, preferably straight-chain alkoxyalkyl, 1E-alkenyl or 1E-alkenyloxy, preferably having 1 to 5 carbon atoms,

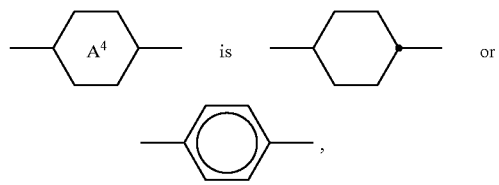

$Z^4$ is COO, $CH_2CH_2$, —C≡C— or preferably a single bond, where the phenyl rings, independently of one another, may optionally be monosubstituted or disubstituted by F, and $n^4$ is 0, 1 or 2, preferably 0 or 1.

The liquid-crystal medium employed optionally comprises one or more compound(s) of the formula V

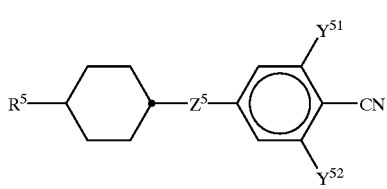

V in which $R^5$ is alkyl having 1 to 9 carbon atoms, preferably n-alkyl, preferably having 2 to 7 carbon atoms, $Z^5$ is —$CH_2CH_2$—, —CH=CH— or —COO—, preferably —CH=CH— or —COO—, particularly preferably —COO—, and $Y^{51}$ and $Y^{52}$ are each, independently of one another, H or F, preferably one is H and the other is F or both are F, particularly preferably both are H.

The liquid-crystal medium employed preferably comprises one or more compound(s) of the formula VI

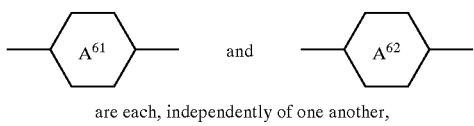

VI in which $R^6$ is as defined above under the formula I for $R^1$,

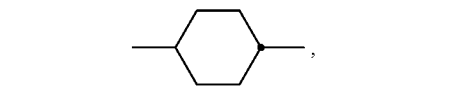

are each, independently of one another,

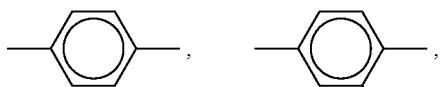

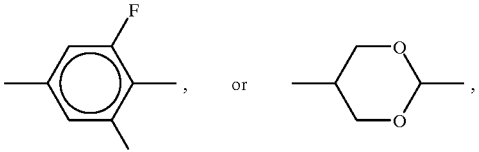

$Z^{61}$ and $Z^{62}$ are each, independently of one another, —$CH_2$—$CH_2$—, —CH=CH—, —COO— or a single bond, $X^6$ is F, Cl, $OCF_2H$, $OCF_3$ or $CF_3$, $Y^{61}$ and $Y^{62}$ are each, independently of one another, H or F, and $n^6$ is 0, 1 or 2, preferably 0 or 1.

Particular preference is given to liquid-crystal media which comprise one or more compound(s) of the formula I selected from the group consisting of the compounds of the subformulae I1 to I3

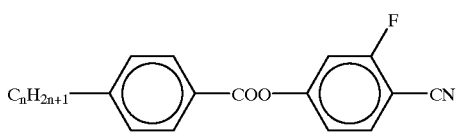

I1

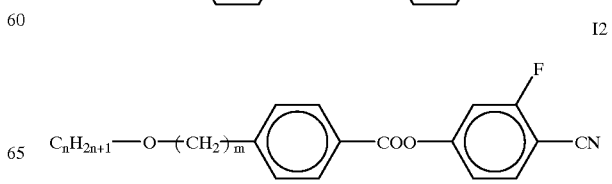

I2

-continued

I3

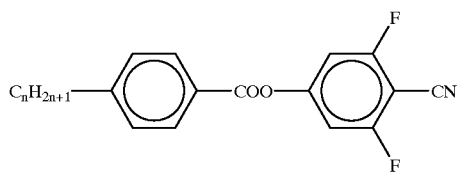

in which n is from 1 to 9, preferably from 2 to 7, and
m is from 1 to 3

The liquid-crystal media employed in accordance with the invention preferably comprise one or more compound(s) of the formula II selected from the group consisting of the compounds of the subformulae II1 to II3:

II1

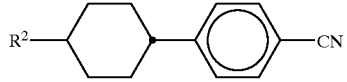

II2

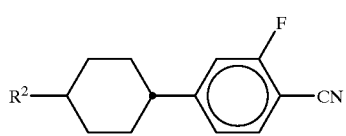

II3

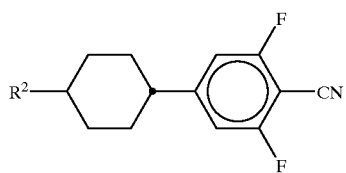

in which $R^2$ is as defined above under the formula II.

The liquid-crystal medium employed particularly preferably comprises one or more compound(s) selected from the group consisting of the compounds of the formulae III1 to III3:

III1

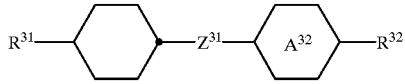

III2

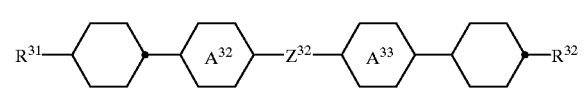

III3 in which $R^{31}$, $R^{32}$, $Z^{31}$, $Z^{32}$,

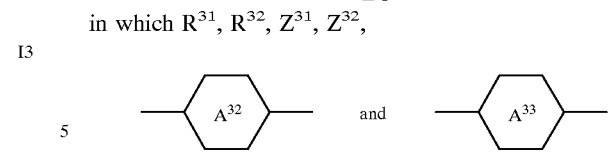

are each as defined above under the formula III.

The liquid-crystal medium employed especially preferably comprises one or more compound(s) selected from the group consisting of the compounds of the formulae III1a to III1d, III2a to III2e, III3a to III3d and III4a:

III1a

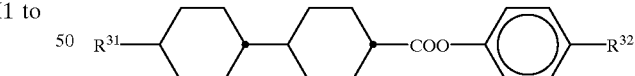

III1b

III1c

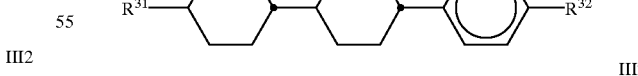

III1d

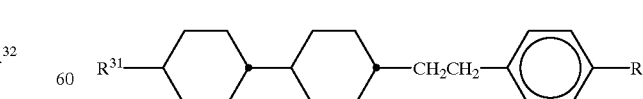

in which n and m are each, independently of one another, from 1 to 5, and o and p are each, independently thereof and from one another, are from 0 to 3, III2a

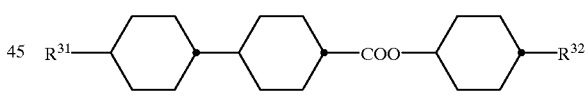

III2b

III2c

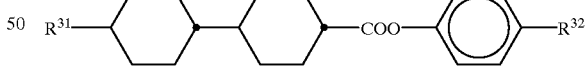

III2d

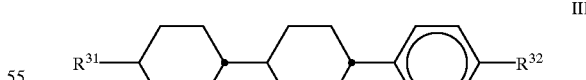

III2e

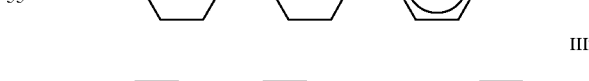

-continued

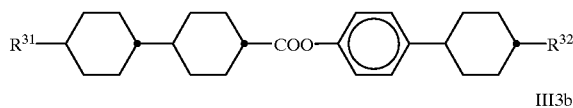
III3a

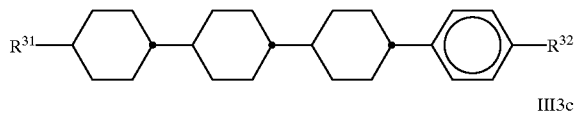
III3b

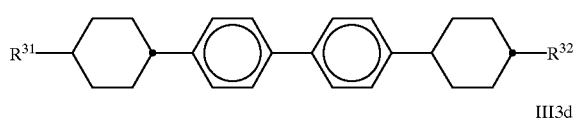
III3c

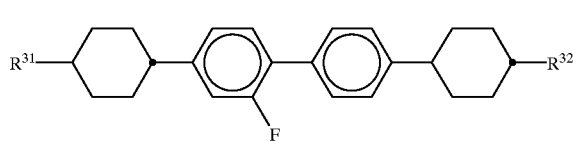
III3d

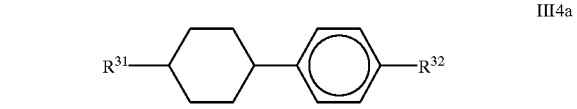
III4a in which $R^{31}$ and $R^{33}$ are each as defined above under the formula III1, and the phenyl rings may optionally be fluorinated, but not in such a way that the compounds are identical with those of the formula II and their subformulae. $R^{31}$ is preferably n-alkyl having 1 to 5 carbon atoms, particularly preferably having 1 to 3 carbon atoms, and $R^{32}$ is preferably n-alkyl or n-alkoxy having 1 to 5 carbon atoms or alkenyl having 2 to 5 carbon atoms. Of these, particular preference is given to the compounds of the formulae III1a to III1d.

The liquid-crystal medium employed preferably comprises one or more compound(s) selected from the group consisting of the compounds of the formulae IV1a to IV1c, IV2a to IV2d and IV3a to IV3b:

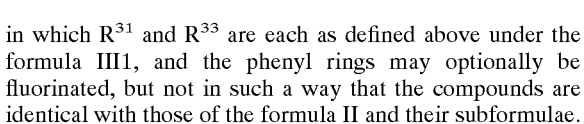
IV1a

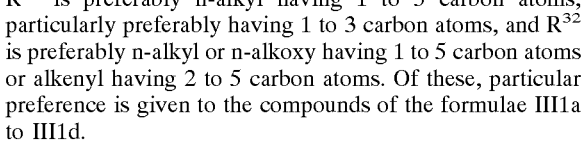
IV1b

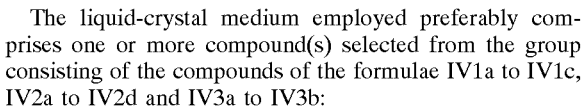
IV1c

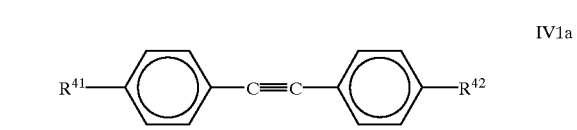
IV2a

-continued

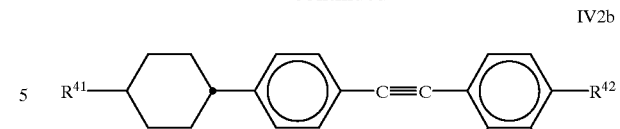
IV2b

IV2c

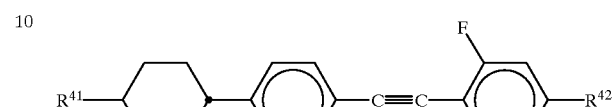
IV2d

IV3a

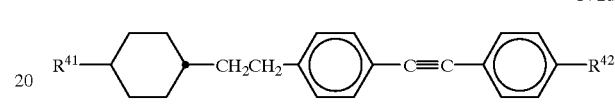
IV3b in which $R^{41}$ and $R^{42}$ are as defined above under the formula IV.

The liquid-crystal medium employed preferably comprises one or more compound(s) selected from the group consisting of the compounds of the formulae V1a to V1c and V2a to V2c:

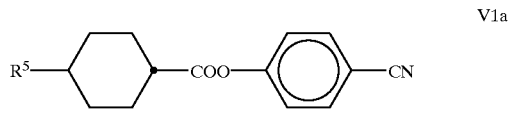
V1a

V1b

V1c

-continued

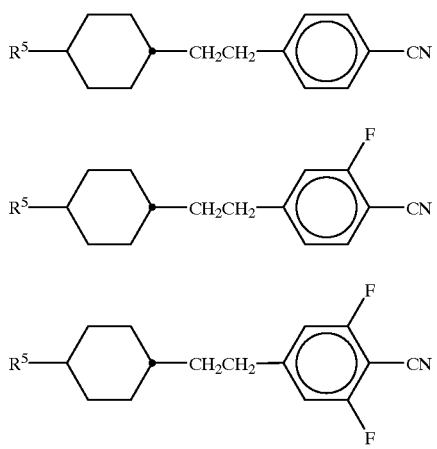

V2a
V2b
V2c in which

R⁵ is as defined above under the formula V.

The liquid-crystal medium employed preferably comprises one or more compound(s) selected from the group consisting of the compounds of the formulae VI1a to VI1d, VI2a to VI2d and VI3a and VI3b:

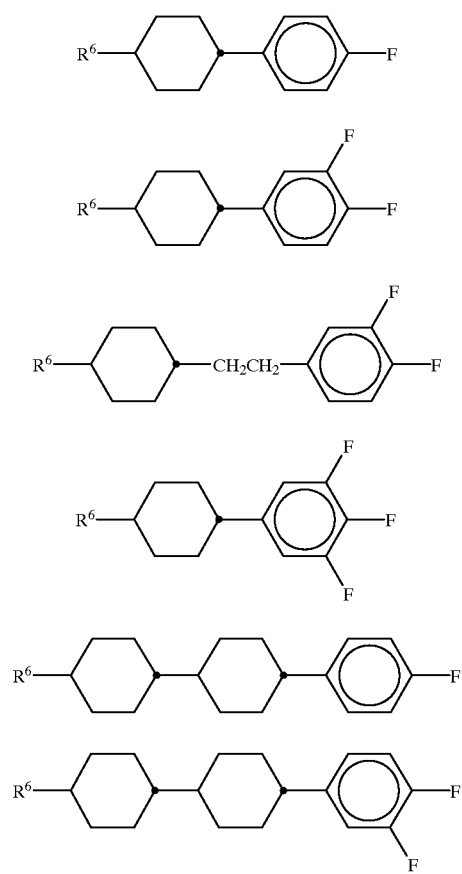

VI1a
VI1b
VI1c
VI1d
VI2a
VI2b

-continued

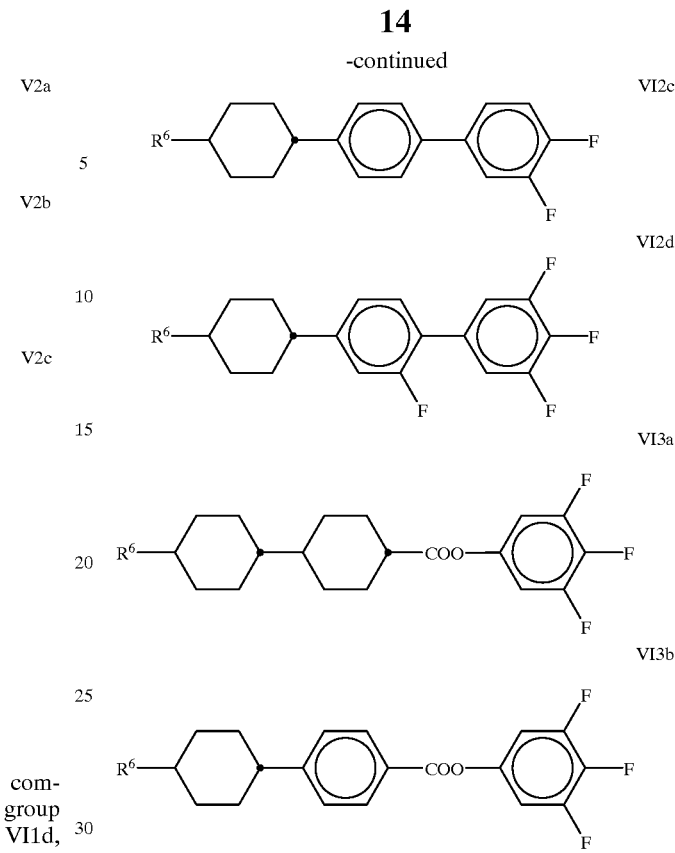

VI2c
VI2d
VI3a
VI3b in which

R⁶ is as defined above under the formula VI.

The liquid-crystal media employed in accordance with the invention preferably comprise from 40% to 75% of one or more, preferably more, preferably highly dielectrically positive compound(s) selected from the group consisting of the compounds of the formulae I and II, preferably from the group consisting of the compounds of the formulae I1 and I2.

In a preferred embodiment, the liquid-crystal media employed in accordance with the invention comprise in total, based on the mixture as a whole, from 40% to 70% of compounds of the formula I
from 0% to 30% of compounds of the formula II, and
from 0% to 40% of compounds of the formula III.

Here, as in the entire present application, the term "compounds", for clarification also written as compound(s), is taken to mean, unless expressly stated otherwise, both one compound and a plurality of compounds.

The individual compounds of Formulas I to VI here are generally employed in concentrations of from 1% to 30%, preferably from 2% to 20% and particularly preferably from 4% to 16%.

In a particularly preferred embodiment, the compounds of the various formulae are employed in the liquid-crystal media employed in accordance with the invention as summarized in the following table.

| Formulae | | Ranges | | |
| --- | --- | --- | --- | --- |
| gen. | preferably | generally | preferably | part. pref. |
| I | I1 | 42% to 65% | 45% to 60% | 45% to 58% |
| II | II3 | 0% to 25% | 0% to 20% | 5% to 20% |
| III | III1a-III1c, III2c, III3a, III3b and III3d | 0% to 36% | 0% to 30% | 2% to 20% |
| IV | IV1a, V2a and IV3b | 0% to 20% | 5% to 15% | 7% to 14% |
| V | V1a | 0% to 20% | 0% to 15% | 0% to 10% |
| VI | VI1, VI2c and VI3a | 0% to 40% | 2% to 30% | 3% to 25% |

The liquid-crystal media in this embodiment very particular preferably comprise in total from 50% to 58% of compounds of the formula I,
from 7% to 16% of compounds of the formula II,
from 2% to 20% of compounds of the formula III,
from 7% to 14% of compounds of the formula IV,
from 0% to 10% of compounds of the formula V, and
from 10% to 25% of compounds of the formula VI.

In a particularly preferred embodiment, which may be identical and preferably is identical with the preferred embodiments described above for the preferred concentrations ranges, the liquid-crystal media comprise
  one or more compounds of the formula I1 and/or
  one or more compounds of the formula II3 and/or
  one or more compounds selected from the group consisting of the compounds of the formula III1a to III1c and/or
  one or more compounds selected from the group consisting of the compounds of the formulae III2 to III3 and/or
  one or more compounds selected from the group consisting of the compounds of the formulae VI1d, VI2b, VI2c, VI3a and VI3b.

Particular preference is given here to liquid-crystal media which satisfy one or more of the following conditions. The media comprise
  one or more compounds of the formula I1, in particular in each case in concentrations of from 3% to 15% per compound,
  one or more compounds of the formula II3, in particular in each case in concentrations of from 5% to 20% per compound,
  one or more compounds of the formula III1, in particular in each case in concentrations of from 3% to 15% per compound,
  one or more compounds of the formula III2, in particular in each case in concentrations of from 3% to 12% per compound, preferably in each case at least one compound in which $R^{31}$ is alkenyl,
  one or more compounds of the formulae III1a and/or III1c, in particular in concentrations of from 4% to 15% per compound,
  one or more compounds of the formula III2a,
  one or more compound(s) of the formula VI2b and/or of the formula VI3a.

The above-mentioned preferred concentration ranges particularly preferably also apply to this preferred combination of compounds.

The liquid-crystal media used in accordance with the invention preferably have nematic phases of in each case at least from −20° C. to 70° C., preferably from −30° C. to 80° C. and very particularly preferably from −40° C. to 80° C. The term "have a nematic phase" here means firstly that no smectic phase and no crystallization are observed at low temperatures at the corresponding temperature and secondly that no clearing occurs on heating from the nematic phase. The investigation at low temperatures is carried out in a flow viscometer at the corresponding temperature and checked by storage in test cells having a layer thickness corresponding to the electro-optical application for at least 100 hours. At high temperatures, the clearing point is measured by conventional methods in capillaries.

Furthermore, the liquid-crystal media used in accordance with the invention are characterized by optical anisotropy values which are particularly suitable for STN displays having conventional layer thicknesses. The birefringence values are in the range from 0.100 to 0.180, preferably in the range from 0.120 to 0.170 and very particularly preferably in the range from 0.120 to 0.160 and most preferably in the range from 0.130 to 0.150.

In addition, the liquid-crystal displays according to the invention have relatively low threshold voltage values of less than or equal to 1.8 V, preferably less than or equal to 1.7 V, particularly preferably less than or equal to 1.5 V and very particularly preferably less than or equal to 1.0 V.

The steepness values of the electro-optical-characteristic line of the liquid-crystal displays are preferably less than or equal to 1.100, particularly preferably less than or equal to 1.080, very particularly preferably less than or equal to 1.060 and in particular less than or equal to 1.040. They are generally at values of 1.020 or greater.

The use of alignment layers of low layer thickness improves the steepness of the electro-optical characteristic line of the displays. The difference in the steepness of the characteristic line from 1 ($V_{90}/V_{10}-1$) of the displays according to the invention is preferably less than 80% of the corresponding value of an otherwise identical display having alignment layers with a layer thickness of 100 nm. This value is particularly preferably less than 70% and very particularly preferably at most 50% of the comparative value of the comparative display having an alignment layer with a thickness of 100 nm. Particular preference is given to liquid-crystal displays in which the difference of the steepness values from 1 is 90% or less, preferably 75% or less and particularly preferably 50% or less than the corresponding value of a comparative display having a layer thickness of the alignment layer of 70 nm.

The alignment layer preferably has a refractive index in the range from 1.550 to 1.800, particularly preferably in the range from 1.590 to 1.750 and very particularly preferably in the range from 1.600 to 1.700.

The transmission by the alignment layer (where twice the layer thickness is taken into account since both substrates of the display carry an alignment layer) at a wavelength of 390 nm is preferably 90% or more, particularly preferably 95% or more, very particularly preferably 97% or more and in particular 99% or more.

The various preferred ranges for the values of the individual physical properties of the alignment layer and of the liquid-crystal material are preferably also observed both with one another and combined amongst one another. Thus, for example, the liquid-crystal media according to the invention have, in particular, the following property combinations:

| Embodiment | Phase: T/°C | Δn | $V_{10}(240°/5°)$/V |
|---|---|---|---|
| Preferred | ≦ −20 to ≧ 80 | 0.12 ≦ to ≦ 0.18 | ≦2.0 |
| Particularly preferred | ≦ −30 to ≧ 90 | 0.13 ≦ to ≦ 0.17 | ≦1.9 |
| Especialy preferred | ≦ −40 to ≧ 100 | 0.14 ≦ to ≦ 0.07 | ≦1.8 | where here, as in the entire application, "≦" means less than or equal to, and "≧" means greater than or equal to.

The twist angle of the liquid-crystal layer of the liquid-crystal displays according to the invention is preferably from 180° C. to 290° C., particularly preferably from 180° to 270°, very particular preferably from 180° to 260° and especially preferably from 200° to 245°.

The surface tilt angle is preferably in the range from 20° to 25°, particularly preferably in the range from 3° to 15°, very particularly preferably in the range from 3° to 9° and in particular in the range from 4° to 7°.

The layer thickness of the liquid-crystal layer of the displays according to the invention is preferably from 3μm to 8 μm, particular preferably from 4 μm to 6.5 μm.

The term "alkyl" preferably covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" preferably covers straight-chain and branched alkenyl groups having 2–7 carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of further preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "oxaalkyl" or alkoxyalkyl preferably covers straight-chain radicals of the formula $C_nH_{2n+1}$—O—$(CH_2)_m$, in which n and m are each, independently of one another, from 1 to 6, and the sum of m+n is up to 7. Preferably, n=1 and m is from 1 to 6.

Through a suitable choice of the meanings of the parameters of the compounds, in particular of $R^1$, $Y^1$, $R^2$, $Y^{21}$, $Y^{22}$ but also the parameters of the other compounds, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio of the elastic constants $k_{33}$ (bend) and $k_{11}$ (splay) compared with alkyl or alkoxy radicals. 4-alkenyl radicals, 3-alkenyl radicals and the like generally give lower threshold voltages and smaller values of $k_{33}/k_{11}$ compared with alkyl and alkoxy radicals.

A —$CH_2CH_2$— group generally results in higher values of $k_{33}/k_{11}$ compared with the single covalent bond. Higher values of $k_{33}/k_{11}$ facilitate, for example, flatter transmission characteristic lines in TN cells with a 90° twist (for achieving grey shades) and steeper transmission characteristic lines in STN, SBE and OMI cells (greater multiplexability), and vice versa.

In the present application, the term "dielectrically very highly positive compounds" denotes compounds having a Δ∈ of >20, the term "dielectrically highly positive compounds" denotes compounds having a Δ∈ in the range from less than 20 to Δ∈=10, the term "dielectrically slightly positive compounds" denotes compounds having a Δ∈ in the range from less than 10 to Δ∈>1.5, the term "dielectrically neutral compounds" denotes those in which −1.5≦Δ∈≦1.5, and the term "dielectrically negative compounds" denotes those in which Δ∈ is <−1.5. The dielectric anisotropy of the compounds is determined here by dissolving 10% of the compounds in a liquid-crystalline host and determining the capacitance of this mixture in at least one test cell in each case with a thickness of 10 μm with homeotropic and with homogeneous surface alignment at 1 kHz. The measurement voltage is typically from 0.2 V to 1.0 V, but is always less than the capacitive threshold of the respective liquid-crystal mixture.

The host mixture used for dielectrically positive compounds is ZLI-4792, and the host mixture used for dielectrically neutral and dielectrically negative compounds is ZLI-3086, both from Merck KGaA, Germany. The values for the respective compounds to be investigated are obtained from the change in the dielectric constants of the host mixture after addition of the compound to be investigated and extrapolation to 100% of the compound employed.

The term "threshold voltage" usually relates to the optical threshold for 10% relative contrast ($V_{10}$).

All concentrations in this application, unless explicitly stated otherwise, are given in per cent by weight and relate to the corresponding mixture as a whole. All physical properties are and were determined in accordance with "Merck Liquid Crystals, Physical Properties of Liquid Crystals", as of Nov. 1997, Merck KGaA, Germany, and apply for a temperature of 20° C., unless explicitly stated otherwise. Δn is determined at 589 nm and Δ∈ at 1 kHz.

The threshold voltages and the other electro-optical properties were determined in test cells manufactured at Merck KGaA, Germany, using white light and using a commercial Autronic-Melchers DMS-301 measuring instrument. To this end, cells were selected, depending on Δn of the liquid crystals, having a thickness corresponding to an optical retardation d·Δn of the cells of about 0.85 μm. The cells had a twist angle of 240°. The d/P value was set at 0.53 by means of the chiral dopant S-811 (Merck KGaA, Darmstadt, Germany). The cells were operated in so-called "yellow mode". For the standard characterization of the electro-optical properties of the liquid-crystal mixtures, in particular of the characteristic voltages, such as the threshold voltage, cells containing SE 4110 from Nissan Chemicals, Japan, with a layer thickness of the polyimide of about 30 nm as alignment layer were used. The characteristic voltages were all determined with perpendicular observation. The threshold voltage was indicated as $V_{10}$ for 10% relative contrast, the mid-grey voltage $V_-$, was indicated for 50% relative contrast and the saturation voltage $V_{90}$ was indicated for 90% relative contrast.

In the case of some liquid-crystal media, the threshold voltage was additionally determined as the capacitive threshold $V_0$ (also known as the Freedericks threshold).

The liquid-crystal media according to the invention may, if desired, also comprise furthermore additives in the conventional amounts. The amount of these additives employed, like that of the chiral dopants, is in total from 0% to 10%, based on the amount of the mixture as a whole, preferably from 0.1% to 6%. The concentration of the individual compounds employed is preferably from 0.1 to 3%. The concentration of these and similar additives is not taken into account when specifying the concentrations and the concentration ranges of the liquid-crystal compounds in the liquid-crystal media.

The liquid-crystal media employed in accordance with the invention consist of a plurality of compounds, preferably from 3 to 30, particularly preferably from 6 to 20 and very particularly preferably from 10 to 16 compounds, which are mixed in a conventional manner. In general, the desired amount of the components used in lesser amount are dissolved in the components making up the principal constituent, advantageously at elevated temperature. If the selected temperature is above the clearing point of the principal constituent, the completeness of the dissolution process is particularly easy to observe. However, it is also possible to prepare the liquid-crystal mixtures by other conventional methods, for example using premixtures or from a so-called "multibottle system". By means of suitable additives, the liquid-crystal phases employed in accordance with the invention can be modified in such a way that they can be employed in any type of STN display that has been disclosed hitherto.

The entire disclosure of all applications, patents and publications, cited above and below, and of corresponding German Application No. 100 188 882.6, filed Apr. 14, 2000 is hereby incorporated by reference.

The examples below serve to illustrate the invention without representing a limitation. In the examples, the melting point T (C,N), the transition from the smectic (S) to the nematic (N) phase T(S,N) and the clearing point T (N,I) of a liquid-crystal substance are given in degrees Celsius. The percentages are, unless explicitly stated otherwise, per cent by weight above and below, and the physical properties are the values at 20° C., unless explicitly stated otherwise.

All temperature values indicated in this application are° C. and all temperature differences are correspondingly differential degrees, unless explicitly stated otherwise.

In the present application and in the following examples, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is given. In individual cases, the acronym for the parent structure is followed, separated by a dash, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nN.F.F | $C_nH_{2n+1}$ | CN | F | F |
| nF | $C_nH_{2n+1}$ | F | H | H |
| nF.F | $C_nH_{2n+1}$ | F | H | F |
| nF.F.F | $C_nH_{2n+1}$ | F | F | F |
| nOF | $OC_nH_{2n+1}$ | F | H | H |
| nCl | $C_nH_{2n+1}$ | Cl | H | H |
| nCl.F | $C_nH_{2n+1}$ | Cl | H | F |
| nCl.F.F | $C_nH_{2n+1}$ | Cl | F | F |
| nmF | $C_nH_{2n+1}$ | $C_mH_{2m+1}$ | F | H |
| nCF$_3$ | $C_nH_{2n+1}$ | CF$_3$ | H | H |
| nOCF$_3$ | $C_nH_{2n+1}$ | OCF$_3$ | H | H |
| nOCF$_3$.F | $C_nH_{2n+1}$ | OCF$_3$ | H | F |
| nOCF$_3$.F.F | $C_nH_{2n+1}$ | OCF$_3$ | F | F |
| nOCF$_2$ | $C_nH_{2n+1}$ | OCHF$_2$ | H | H |
| nOCF$_2$.F | $C_nH_{2n+1}$ | OCHF$_2$ | H | F |
| nOCF$_2$.F.F | $C_nH_{2n+1}$ | OCHF$_2$ | F | F |
| nS | $C_nH_{2n+1}$ | NCS | H | H |
| nVsN | $CrH_{2r+1}$—CH=CH—$C_sH_{2s}$— | CN | H | H |
| nEsN | $CrH_{2r+1}$—O—$C_sH_{2s}$— | CN | H | H |
| nAm | $C_nH_{2n+1}$ | $COOC_mH_{2m+1}$ | H | H |

TABLE A

PYP

PYRP

BCH

CBC

CCH

CCP

CP

TABLE A-continued
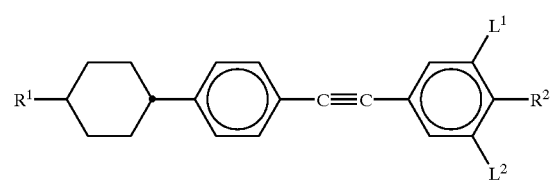
CPTP
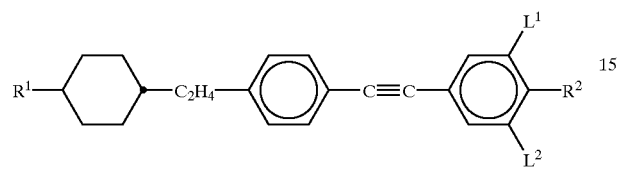
CEPTP
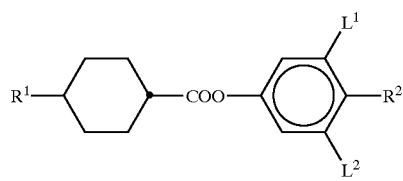
D
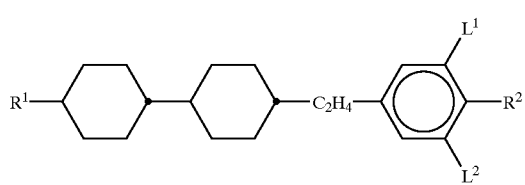
ECCP
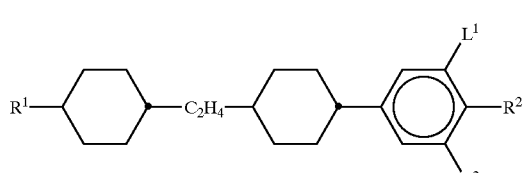
CECP
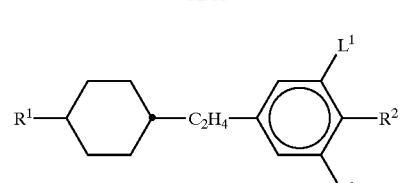
EPCH
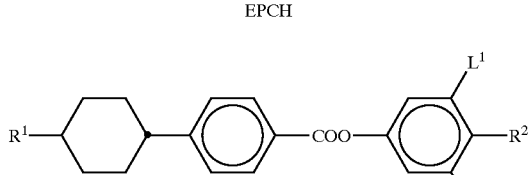
HP
TABLE A-continued
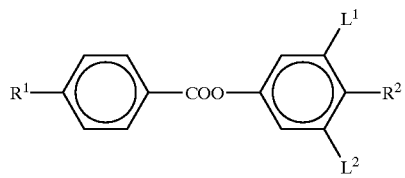
ME
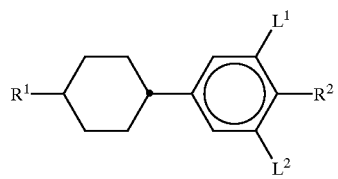
PCH
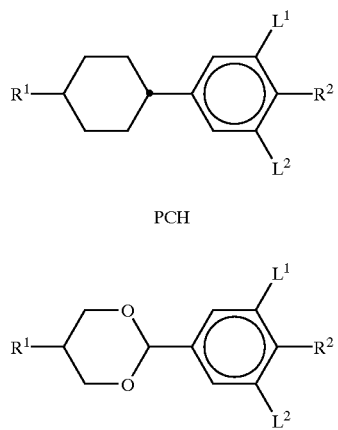
PDX
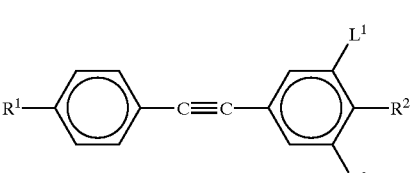
PTP
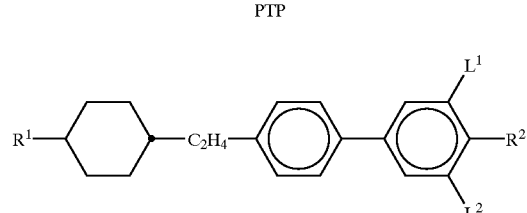
BECH
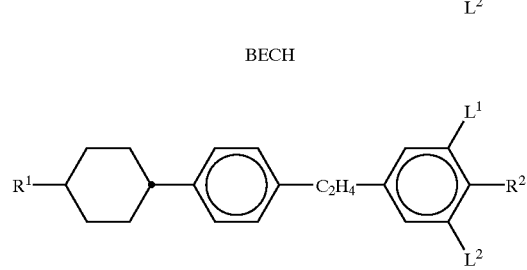
EBCH
CPC TABLE A-continued
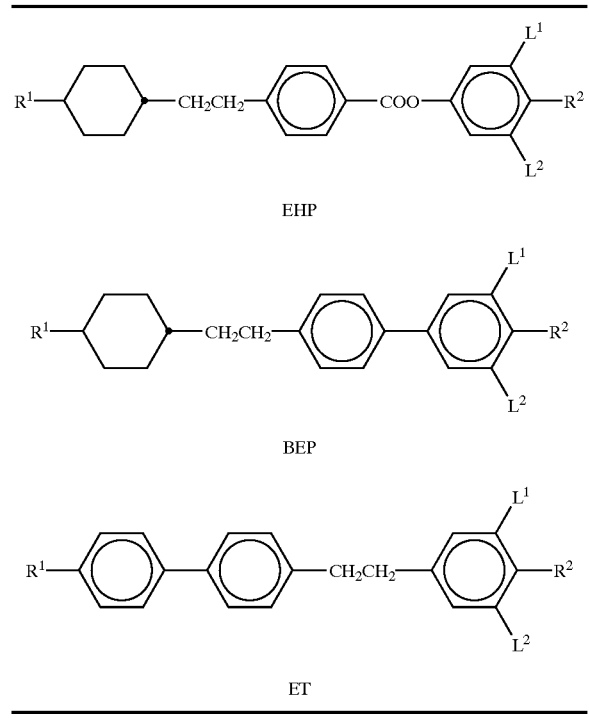
TABLE B
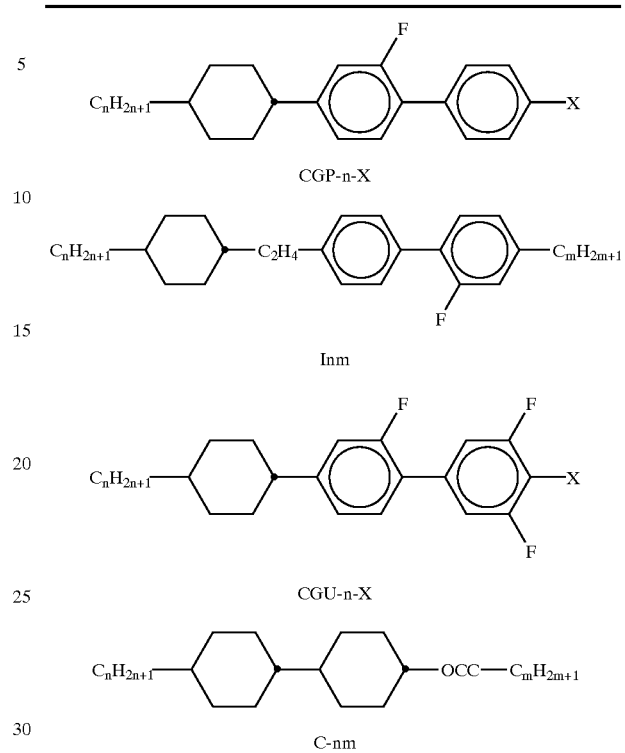
TABLE B-continued
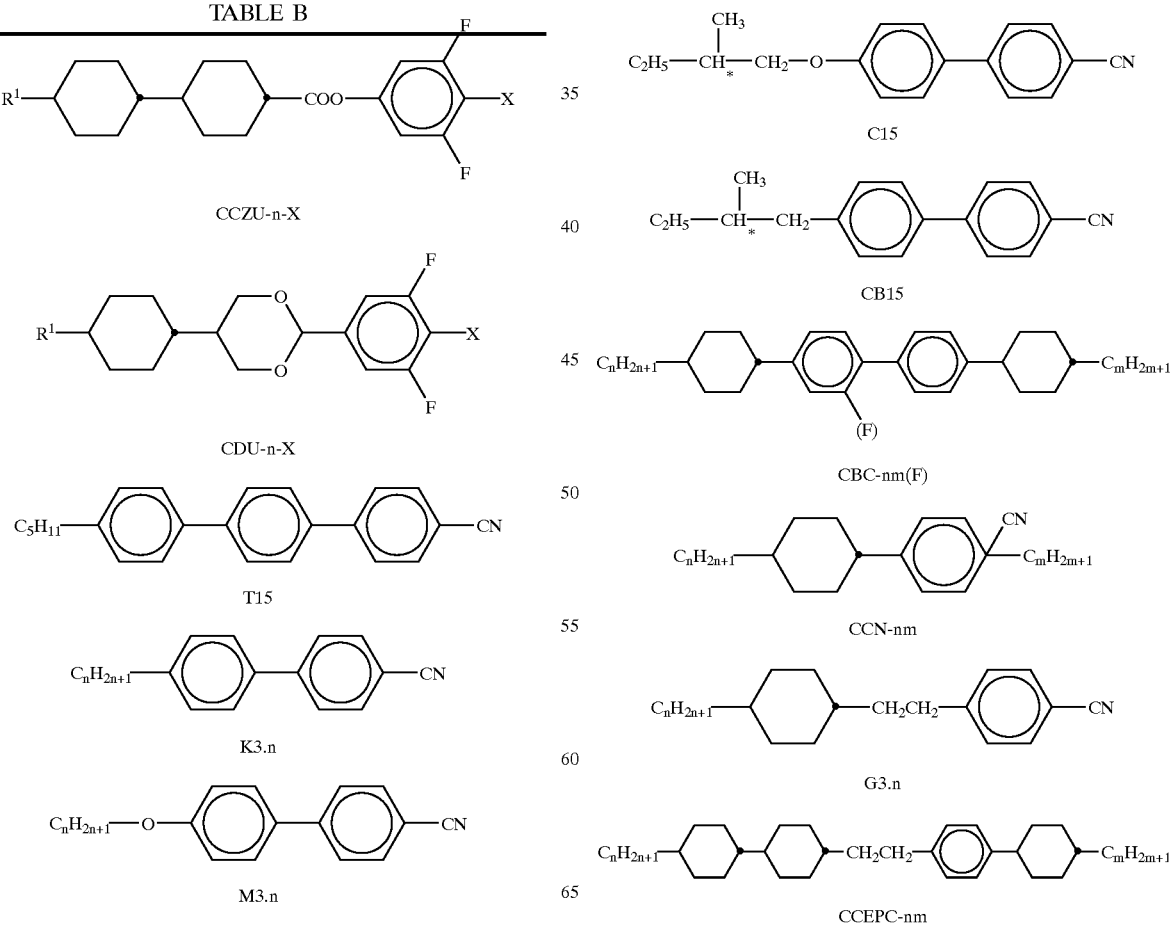

TABLE B-continued
CCPC-nm
CH-nm
HD-nm
HH-nm
NCB-nm
OS-nm
CHE
ECBC-nm
ECCH-nm
CCH-n1Em
T-nFN
TABLE B-continued
B-nO.FN
CVCC-n-m
CVCP-n-m
CVCVC-n-m
CP-V-N
CC-n-V
CCG-V-F
CPP-nV2-m
CCP-V-m

TABLE B-continued

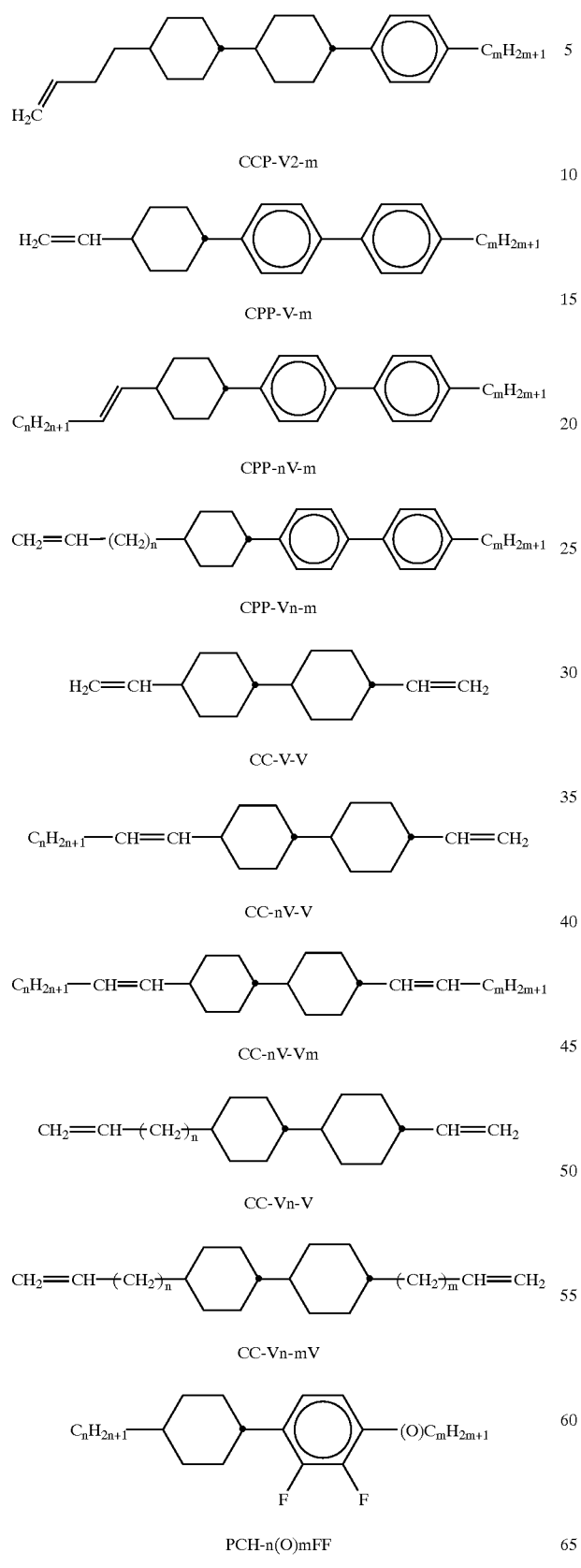
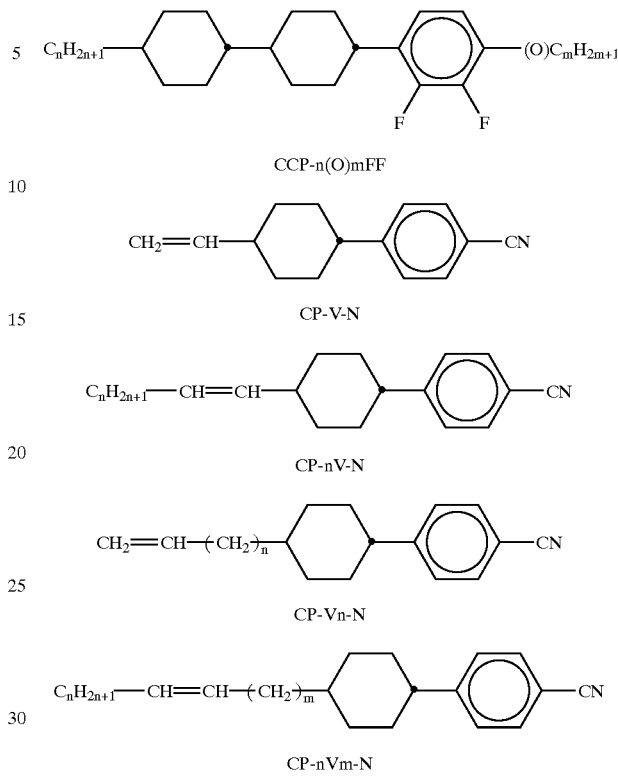

EXAMPLES

The following examples explain the present invention without restricting it in any way. However, they reproduce typical favorable embodiments. From the disclosure content of the examples, further objects of the present invention are evident to the person skilled in the art. In particular, preferred values for the physical properties and their combinations are evident, both for the displays and for the materials used.

Example 1

A liquid-crystal mixture M 1 was prepared. The composition and physical properties of this mixture are shown in the following table (Table 1).

TABLE 1

Composition and properties of mixture M 1

| Compound/ abbreviation | Concentration/ % | Physical properties |
|---|---|---|
| PCH-3N.F.F | 7.0 | Clearing point: T(N, I) = 82.5° C. |
| ME2N.F | 10.0 | $n_e$ (20° C., 589 nm) = 1.6385 |
| ME3N.F | 10.0 | $\Delta n$ (20° C., 589 nm) = 0.1420 |
| ME4N.F | 14.0 | $\varepsilon_{\parallel}$ (20° C., 1 kHz) = 62.6 |
| ME5N.F | 14.0 | $\Delta\varepsilon$ (20° C., 1 kHz) = 51.1 |
| HP-3N.F | 6.0 | |
| HP-4N.F | 5.0 | $HTP_{S-811}$ (20° C.) = −13.96 m$^{-1}$ |
| HP-5N.F | 5.0 | |
| CCZU-2-F | 5.0 | $\phi$ = 240° |
| CCZU-3-F | 9.0 | $V_{10}$ (20° C.) = 0.77 V |

TABLE 1-continued

Composition and properties of mixture M 1

| Compound/abbreviation | Concentration/% | Physical properties |
|---|---|---|
| CCZU-5-F | 5.0 | |
| CCPC-33 | 5.0 | |
| CCPC-34 | 5.0 | |
| Σ | 100.0 | |

The liquid-crystal medium was investigated in test cells with various alignment layers. The alignment layer used for this investigation was the polyimide SE 3140 from Nissan Chemicals, Japan.

For a given polyimide, the layer thickness of the polyimide layer (d(PI)) was varied systematically. It was ensured here that no pinholes occurred, even in the case of the relatively small layer thicknesses.

For the polyimide SE 3140, cells having polyimide layer thicknesses of 15, 30, 50 and 70 nm were investigated. The results for the characteristic voltages are shown in the following table (Table 2).

TABLE 2

Characteristic voltages of STN cells containing SE 3140 and liquid-crystal mixture M 1

| d(PI)/nm | $V_{10}$/V | $V_{90}$/V | $V_{90}/V_{10}$ |
|---|---|---|---|
| 70 | 0.829 | 0.953 | 1.150 |
| 50 | 0.788 | 0.895 | 1.135 |
| 30 | 0.776 | 0.858 | 1.106 |
| 15 | 0.754 | 0.802 | 1.063 |

Example 2

A liquid-crystal mixture M 2 was prepared. The composition and physical properties of this mixture are shown in the following table (Table 3).

TABLE 3

Composition and properties of mixture M 2

| Compound/abbreviation | Concentration/% | Physical properties |
|---|---|---|
| PCH-3N.F.F | 13.0 | Clearing point: T(N, I) = 86.5° C. |
| ME2N.F | 6.0 | $n_e$ (20° C., 589 nm) = 1.6386 |
| ME3N.F | 6.0 | Δn (20° C., 589 nm) = 0.1419 |
| ME4N.F | 10.0 | |
| ME5N.F | 9.0 | $HTP_{S-811}$ (20° C.) = −12.43 m$^{-1}$ |
| CC-S-V | 9.0 | |
| CCG-V-F | 22.0 | Φ = 240° |
| CCPC-33 | 3.0 | $V_{10}$ (20° C.) = 1.15 V |
| CCPC-34 | 3.0 | |
| CBC-33F | 4.0 | |
| CPTP-301 | 5.0 | |
| CPTP-302 | 5.0 | |
| CPTP-303 | 5.0 | |
| Σ | 100.0 | |

As in Example 1, cells containing the polyimide SE 3140 with polyimide layer thicknesses of 15, 30, 50 and 70 nm were produced and investigated. The results for the characteristic voltages are shown in the following table (Table 4).

TABLE 4

Characteristic voltages of STN cells containing SE 3140 and liquid-crystal mixture M 2

| d(PI)/nm | $V_{10}$/V | $V_{90}$/V | $V_{90}/V_{10}$ |
|---|---|---|---|
| 70 | 1.188 | 1.315 | 1.107 |
| 50 | 1.176 | 1.286 | 1.094 |
| 30 | 1.158 | 1.244 | 1.074 |
| 15 | 1.154 | 1.218 | 1.055 |

In the following examples, test cells containing the alignment layer SE 3140 in layer thicknesses of 70, 50, 30 and 15 nm were produced as in Example 1 and filled with various liquid-crystal media and investigated.

Example 3

TABLE 5

Composition and properties of mixture M 3

| Compound/Abbreviation | Concentration/% | Physical properties |
|---|---|---|
| ME2N.F | 14.0 | Clearing point: (N, I) = 90.0° C. |
| ME3N.F | 14.0 | Transition (S, N) < −40° C. |
| ME4N.F | 13.0 | $n_e$(20° C., 589 nm) = 1.6484 |
| ME5N.F | 13.0 | Δn (20° C., 589 nm) = 0.1493 |
| HP-3N.F | 5.0 | ν(20° C.) = 76 cSt |
| HP-4N.F | 5.0 | ν(0° C.) = 454 cSt |
| HP-5N.F | 5.0 | ν(−20° C.) = 7720 cSt |
| CCG-V-F | 13.0 | |
| CC-5-V | 6.0 | Φ = 240° |
| CCPC-33 | 4.0 | $V_{10}$ (20° C.) = 0.82 V |
| CCPC-34 | 4.0 | |
| CCPC-35 | 4.0 | |
| Σ | 100.0 | |

Example 4

TABLE 6

Composition and properties of mixture M 4

| Compound/Abbreviation | Concentration/% | Physical properties |
|---|---|---|
| ME2N.F | 14.0 | Clearing point: (N, I) = 52.0° C. |
| ME3N.F | 14.0 | |
| ME4N.F | 13.0 | Δn (20° C., 589 nm) = 0.1448 |
| ME5N.F | 13.0 | |
| PYP-31 | 5.0 | |
| PYP-32 | 5.0 | |
| HP-3N.F | 5.0 | |
| HP-4N.F | 5.0 | |
| HP-5N.F | 5.0 | |
| CCG-V-F | 15.0 | |
| CC-5-V | 6.0 | |
| Σ | 100.0 | |

Example 5

TABLE 7

Composition and properties of mixture M 5

| Compound/abbreviation | Concentration/% | Physical properties |
|---|---|---|
| ME2N.F | 14.0 | Clearing point: (N, I) = 59.5° C. |
| ME3N.F | 14.0 | Transition (S, N) < −40° C. |
| ME4N.F | 13.0 | Δn (20° C., 589 nm) = 0.1537 |
| ME5N.F | 13.0 | ν(20° C.) = 69 cSt |
| PYP-31 | 6.0 | ν(0° C.) = 440 cSt |
| PYP-32 | 5.0 | ν(−20° C.) = 7070 cSt |
| HP-3N.F | 5.0 | |
| HP-4N.F | 5.0 | |
| HP-5N.F | 5.0 | |
| CCG-V-F | 17.0 | |
| CC-5-V | 3.0 | |
| Σ | 100.0 | |

Example 6

TABLE 8

Composition and properties of mixture M 6

| Compound/Abbreviation | Concentration/% by weight | Physical properties |
|---|---|---|
| ME2N.F | 14.0 | Clearing point (N,I) = 74.5° C. |
| ME3N.F | 14.0 | Δn (20° C., 589 nm) = 0.1593 |
| ME4N.F | 13.0 | |
| ME5N.F | 13.0 | |
| PYP-4 | 8.0 | |
| HP-3N.F | 5.0 | |
| HP-4N.F | 5.0 | |
| HP-5N.F | 5.0 | |
| CCG-V-F | 17.0 | |
| CCPC-33 | 3.0 | |
| CCPC-34 | 3.0 | |
| Σ | 100.0 | |

Example 7

TABLE 9

Composition and properties of mixture M 7

| Compound/Abbreviation | Concentration/% by weight | Physical properties |
|---|---|---|
| ME2N.F | 14.0 | Clearing point (N,I) = 73.0° C. |
| ME3N.F | 14.0 | Δn (20° C., 589 nm) = 0.1658 |
| ME4N.F | 13.0 | |
| ME5N.F | 13.0 | |
| PYP-4 | 12.0 | |
| HP-3N.F | 5.0 | |
| HP-4N.F | 5.0 | |
| HP-5N.F | 5.0 | |
| CCG-V-F | 13.0 | |
| CCPC-33 | 3.0 | |
| CCPC-34 | 3.0 | |
| Σ | 100.0 | |

Example 8

TABLE 10

Composition and properties of mixture M 8

| Compound/Abbreviation | Concentration/% by weight | Physical properties |
|---|---|---|
| ME2N.F | 14.0 | Clearing point (N,I) = 70.0° C. |
| ME3N.F | 14.0 | Transition (S,N) < −40° C. |
| ME4N.F | 13.0 | Δn (20° C., 589 nm) = 0.1537 |
| ME5N.F | 13.0 | ν(20° C.) = 96 cSt |
| PYP-4 | 11.0 | ν(0° C.) = 700 cSt |
| HP-4N.F | 5.0 | ν(−20° C.) = 14760 cSt |
| HP-5N.F | 5.0 | |
| CCZU-2-F | 8.0 | Φ = 90° |
| CCZU-3-F | 11.0 | $V_{10}$ (20° C.) = 0.61 V |
| CCPC-33 | 4.0 | |
| CCPC-34 | 4.0 | |
| Σ | 100.0 | |

Example 9

TABLE 11

Composition and properties of mixture M 9

| Compound/Abbreviation | Concentration/% by weight | Physical properties |
|---|---|---|
| ME2N.F | 14.0 | Clearing point (N,I) = 83.0° C. |
| ME3N.F | 14.0 | $n_e$ (20° C., 589 nm) = 1.6876 |
| ME4N.F | 15.0 | Δn (20° C., 589 nm) = 0.1813 |
| ME5N.F | 15.0 | |
| HP-3N.F | 5.0 | Φ = 90° |
| HP-4N.F | 5.5 | $V_{10}$ (20° C.) = 0.64 V |
| HP-5N.F | 5.5 | |
| CCG-V-F | 12.0 | |
| CPTP-301 | 5.0 | |
| CPTP-302 | 5.0 | |
| CPTP-303 | 4.0 | |
| Σ | 100.0 | |

Example 10

TABLE 12

Composition and properties of mixture M 10

| Compound/Abbreviation | Concentration/% by weight | Physical properties |
|---|---|---|
| ME2N.F | 14.0 | Clearing point (N,I) = 77.5° C. |
| ME3N.F | 14.0 | $n_e$ (20° C., 589 nm) = 1.6798 |
| ME4N.F | 15.0 | Δn (20° C., 589 nm) = 0.1739 |
| ME5N.F | 15.0 | |
| HP-3N.F | 5.0 | Φ = 90° |
| HP-4N.F | 5.0 | $V_{10}$ (20° C.) = 0.63 V |
| HP-5N.F | 5.0 | |
| CCG-V-F | 15.5 | |
| CPTP-301 | 3.5 | |
| CPTP-302 | 4.0 | |
| CPTP-303 | 4.0 | |
| Σ | 100.0 | |

Example 11

TABLE 13

Composition and properties of mixture M 11

| Compound/Abbreviation | Concentration/% by weight | Physical properties |
|---|---|---|
| ME2N.F | 14.0 | Clearing point (N,I) = 89.0° C. |
| ME3N.F | 14.0 | Transition (S,N) < −40° C. |
| ME4N.F | 14.5 | $n_e$ (20° C., 589 nm) = 1.6623 |
| ME5N.F | 14.5 | $\Delta n$ (20° C., 589 nm) = 0.1601 |
| HP-3N.F | 5.0 | $\Delta \epsilon$ (20° C., 1 kHz) = 57.7 |
| HP-4N.F | 5.0 | $\nu$(20° C.) = 95 cSt |
| HP-5N.F | 5.0 | $\nu$(0° C.) = 630 cSt |
| CCG-V-F | 15.5 | $\nu$(−20° C.) = 12800 cSt |
| CPTP-302 | 2.5 | |
| CCPC-33 | 4.0 | $\Phi = 90°$ |
| CCPC-34 | 3.0 | $V_{10}$ (20° C.) = 0.63 V |
| CCPC-35 | 3.0 | |
| Σ | 100.0 | |

Example 12

TABLE 14

Composition and properties of mixture M 12

| Compound/Abbreviation | Concentration/% by weight | Physical properties |
|---|---|---|
| ME2N.F | 12.0 | Clearing point (N,I) = 60.5° C. |
| ME3N.F | 12.0 | Transition (S,N) < −40° C. |
| ME4N.F | 12.0 | $n_e$ (20° C., 589 nm) = 1.6463 |
| ME5N.F | 12.0 | $\Delta n$ (20° C., 589 nm) = 0.1462 |
| PYP-4 | 10.0 | $\Delta \epsilon$ (20° C., 1 kHz) = 57.7 |
| HP-3N.F | 5.0 | $\nu$(20° C.) = 76 cSt |
| HP-4N.F | 5.0 | $\nu$(0° C.) = 440 cSt |
| HP-5N.F | 5.0 | $\nu$(−20° C.) = 6800 cSt |
| CC-5-V | 8.0 | |
| CCZU-2-F | 8.0 | $\Phi = 90°$ |
| CCZU-3-F | 11.0 | $V_{10}$ (20° C.) = 0.66 V |
| Σ | 100.0 | |

Example 13

TABLE 15

Composition and properties of mixture M 13

| Compound/Abbreviation | Concentration/% by weight | Physical properties |
|---|---|---|
| ME2N.F | 13.0 | Clearing point (N,I) = 74.5° C. |
| ME3N.F | 13.0 | $n_e$ (20° C., 589 nm) = 1.6903 |
| ME4N.F | 15.0 | $\Delta n$ (20° C.,589 nm) = 0.1826 |
| ME5N.F | 15.0 | |
| HP-3N.F | 5.0 | $\Phi = 90°$ |
| HP-4N.F | 5.0 | $V_{10}$ (20° C.) = 0.65 V |
| HP-5N.F | 6.0 | |
| CCG-V-F | 16.5 | |
| PPTUI-3-2 | 11.5 | |
| Σ | 100.0 | |

Example 14

TABLE 16

Composition and properties of mixture M 14

| Compound/Abbreviation | Concentration/% by weight | Physical properties |
|---|---|---|
| ME2N.F | 14.0 | Clearing point (N,I) = 72.0° C. |
| ME3N.F | 14.0 | $n_e$ (20° C., 589 nm) = 1.6913 |
| ME4N.F | 15.0 | $\Delta n$ (20° C., 589 nm) = 0.1819 |
| ME5N.F | 15.0 | |
| HP-3N.F | 5.0 | $\Phi = 90°$ |
| HP-4N.F | 5.0 | $V_{10}$ (20° C.) = 0.65 V |
| HP-5N.F | 5.0 | |
| BCH-3F.F | 2.0 | |
| BCH-5F.F | 7.0 | |
| CCG-V-F | 3.0 | |
| CCP-V-1 | 6.0 | |
| PPTUI-3-2 | 9.0 | |
| Σ | 100.0 | |

Example 15

TABLE 17

Composition and properties of mixture M 15

| Compound/Abbreviation | Concentration/% by weight | Physical properties |
|---|---|---|
| ME2N.F | 10.0 | Clearing point (N,I) = 103.5° C. |
| ME3N.F | 10.0 | $n_e$ (20° C., 589 nm) = 1.6767 |
| ME4N.F | 12.0 | $\Delta n$ (20° C., 589 nm) = 0.1728 |
| ME5N.F | 12.0 | |
| CCG-V-F | 19.0 | $\Phi = 240°$ |
| CCP-V-1 | 8.0 | $V_{10}$ (20° C.) = 1.10 V |
| PTP-102 | 5.0 | |
| CPTP-301 | 5.0 | |
| CPTP-302 | 5.0 | |
| CPTP-303 | 5.0 | |
| CCPC-33 | 5.0 | |
| CCPC-34 | 4.0 | |
| Σ | 100.0 | |

Example 16

TABLE 18

Composition and properties of mixture M 16

| Compound/Abbreviation | Concentration/% by weight | Physical properties |
|---|---|---|
| ME2N.F | 10.0 | Clearing point (N, I) = 108.0° C. |
| ME3N.F | 10.0 | $n_e$ (20° C., 589 nm) = 1.6435 |
| ME4N.F | 13.0 | $\Delta n$ (20° C., 589 nm) = 0.1436 |
| ME5N.F | 13.0 | |
| CCG-V-F | 22.0 | $\Phi = 240°$ |
| CCP-V-1 | 10.0 | $V_{10}$ (20° C.) = 1.10 V |
| CPTP-302 | 3.0 | |
| CBC-33F | 4.0 | |
| CCPC-33 | 5.0 | |
| CCPC-34 | 5.0 | |
| CCPC-35 | 5.0 | |
| Σ | 100.0 | |

Example 17

TABLE 19

Composition and properties of mixture M 17

| Compound/Abbreviation | Concentration/% by weight | Physical properties |
|---|---|---|
| ME2N.F | 12.0 | Clearing point (N, I) = 103.0° C. |
| ME3N.F | 10.0 | $n_e$ (20° C., 589 nm) = 1.6435 |
| ME4N.F | 13.0 | $\Delta n$ (20° C., 589 nm) = 0.1435 |
| ME5N.F | 10.0 | |
| PCH-3 | 8.0 | $\Phi = 240°$ |
| CCG-V-F | 10.0 | $V_{10}$ (20° C.) = 1.12 V |
| CCP-V-1 | 6.0 | |
| CCP-V2-1 | 12.0 | |
| CPTP-302 | 1.0 | |
| CBC-33 | 3.0 | |
| CCPC-33 | 5.0 | |
| CCPC-34 | 5.0 | |
| CCPC-35 | 5.0 | |
| Σ | 100.0 | |

Example 18

TABLE 20

Composition and properties of mixture M 18

| Compound/Abbreviation | Concentration/% by weight | Physical properties |
|---|---|---|
| ME2N.F | 9.0 | Clearing point (N, I) = 94.5° C. |
| ME3N.F | 9.0 | Transition (S, N) < −40° C. |
| ME4N.F | 10.0 | $n_e$ (20° C., 589 nm) = 1.6260 |
| ME5N.F | 8.0 | $\Delta n$ (20° C., 589 nm) = 0.1292 |
| PCH-3N.F.F | 10.0 | $\Delta \epsilon$ (20° C., 1 kHz) = 29.3 |
| CC-5-V | 6.0 | $\nu$ (20° C.) = 38 cSt |
| CCG-V-F | 16.0 | $\nu$ (0° C.) = 160 cSt |
| CCP-V-1 | 11.0 | $\nu$ (−20° C.) = 1500 St |
| CPTP-301 | 2.0 | $\nu$ (−30° C.) = 8200 cSt |
| CBC-33 | 2.0 | $k_1$ (20° C.) = 8.3 pN |
| CBC-33F | 2.0 | $k_3/k_1$ (20° C.) = 2.62 |
| CCPC-33 | 5.0 | |
| CCPC-34 | 5.0 | $\Phi = 240°$ |
| CCPC-35 | 5.0 | $V_{10}$ (20° C.) = 1.15 V |
| Σ | 100.0 | |

Example 19

TABLE 21

Composition and properties of mixture M 19

| Compound/Abbreviation | Concentration/% by weight | Physical properties |
|---|---|---|
| ME2N.F | 9.0 | Clearing point (N, I) = 111.0° C. |
| ME3N.F | 9.0 | $n_e$ (20° C., 589 nm) = 1.6243 |
| ME4N.F | 10.0 | $\Delta n$ (20° C., 589 nm) = 0.1292 |
| ME5N.F | 108.0 | |
| CCZU-2-F | 4.0 | $\Phi = 240°$ |
| CCZU-3-F | 9.0 | $V_{10}$ (20° C.) = 1.12 V |
| CCZU-5-F | 4.0 | |
| CCG-V-F | 16.0 | |
| CCP-V-1 | 12.0 | |
| CPTP-301 | 2.0 | |
| CCPC-33 | 5.0 | |
| CCPC-34 | 5.0 | |
| CCPC-35 | 5.0 | |
| Σ | 100.0 | |

Example 20

TABLE 22

Composition and properties of mixture M 20

| Compound/Abbreviation | Concentration/% by weight | Physical properties |
|---|---|---|
| ME2N.F | 10.0 | Clearing point (N, I) = 94.5° C. |
| ME3N.F | 10.0 | Transition (S, N) < −40° C. |
| ME4N.F | 12.0 | $n_e$ (20° C., 589 nm) = 1.6501 |
| ME5N.F | 12.0 | $\Delta n$ (20° C., 589 nm) = 0.1515 |
| PTP-102 | 3.0 | $\Delta \epsilon$ (20° C., 1 kHz) = 30.1 |
| CC-5-V | 11.0 | $\nu$ (20° C.) = 39 cSt |
| CCG-V-F | 19.0 | $\nu$ (0° C.) = 165 cSt |
| CPTP-301 | 4.0 | $\nu$ (−20° C.) = 1630 St |
| CPTP-302 | 4.0 | $\nu$ (−30° C.) = 9100 cSt |
| CPTP-303 | 3.0 | $k_1$ (20° C.) = 9.0 pN |
| CCPC-33 | 4.0 | $k_3/k_1$ (20° C.) = 2.39 |
| CCPC-34 | 4.0 | |
| CCPC-35 | 4.0 | $\Phi = 240°$ |
| Σ | 100.0 | $V_{10}$ (20° C.) = 1.12 V |

Example 21

TABLE 23

Composition and properties of mixture M 21

| Compound/Abbreviation | Concentration/% by weight | Physical properties |
|---|---|---|
| ME2N.F | 10.0 | Clearing point (N, I) = 108.5° C. |
| ME3N.F | 10.0 | $n_e$ (20° C., 589 nm) = 1.6520 |
| ME4N.F | 12.0 | $\Delta n$ (20° C., 589 nm) = 0.1521 |
| ME5N.F | 12.0 | |
| CC-5-V | 4.0 | $\Phi = 240°$ |
| CCG-V-F | 19.0 | $V_{10}$ (20° C.) = 1.13 V |
| CCP-V-1 | 8.0 | |
| CPTP-301 | 4.0 | |
| CPTP-302 | 4.0 | |
| CPTP-303 | 3.0 | |
| CCPC-33 | 5.0 | |
| CCPC-34 | 5.0 | |
| CCPC-35 | 4.0 | |
| Σ | 100.0 | |

Example 22

TABLE 24

Composition and properties of mixture M 22

| Compound/Abbreviation | Concentration/% by weight | Physical properties |
|---|---|---|
| ME2N.F | 8.0 | Clearing point (N, I) = 94.5° C. |
| ME3N.F | 8.0 | $n_e$ (20° C., 589 nm) = 1.6439 |
| ME4N.F | 11.0 | $\Delta n$ (20° C., 589 nm) = 0.1448 |
| ME5N.F | 10.0 | |
| PCH-3 | 20.0 | $\Phi = 240°$ |
| CCG-V-F | 11.0 | $V_{10}$ (20° C.) = 1.20 V |
| CCP-V-1 | 9.0 | |
| CPTP-302 | 2.0 | |
| D-302FF | 2.0 | |
| CBC-33 | 5.0 | |
| CBC-33F | 4.0 | |
| CCPC-34 | 5.0 | |
| CCPC-34 | 5.0 | |
| Σ | 100.0 | |

The preceding examples can be repeated with similar success by substituting the generically or specifically

What is claimed is:

1. An electro-optical liquid-crystal display comprising a layer of liquid-crystal medium between two substrates with organic alignment layers on inside surfaces of each of said substrates;
   the liquid-crystal layer having a twist angle, from one substrate to the other, of 110°–360°;
   the liquid-crystal layer having a surface tilt angle of 2°–20°; and
   each of said organic alignment layers having a thickness of 3 nm–150 nm, and
   wherein the difference from 1 of the steepness of the electric-optical characteristic line, represented by the formula $V_{90}/V_{10}-1$, is half or less of the corresponding value of an otherwise identical display in which the layer thicknesses of each of the alignment layers is 100 nm.

2. A display according to claim 1, at least one of said alignment layers has a layer thickness of 4 nm–60 nm.

3. A display according to claim 1, wherein the steepness of the electro-optical characteristic line $V_{90}/V_{10}$ is 1.06 or less.

4. A display according to claim 1, wherein the threshold voltage ($V_{10}$) of the display is 1.20 V or less.

5. A display according to claim 1, wherein said liquid-crystal medium comprises one or more compound(s) of formula I $$R^1-\phenyl-COO-\phenyl(F,Y^1)-CN \quad \text{I}$$

wherein
$R^1$ is alkyl having 1 to 7 carbon atoms, alkoxy having 1 to 7 carbon atoms, alkoxyalkyl having 2 to 7 carbon atoms, alkenyl having 2 to 7 carbon atoms or alkenyloxy having 2 to 7 carbon atoms, and
$Y^1$ is H or F.

6. A display according to claim 1, wherein said liquid crystal medium comprises at least one compound of formula II $$R^2-\text{cyclohexyl}-\phenyl(Y^{21},Y^{22})-CN \quad \text{II}$$

wherein
$R^2$ is alkyl having 1 to 7 carbon atoms, alkoxy having 1 to 7 carbon atoms, alkoxyalkyl having 2 to 7 carbon atoms, alkenyl having 2 to 7 carbon atoms or alkenyloxy having 2 to 7 carbon atoms, and
$Y^{21}$ and $Y^{22}$ are each, independently, H or F.

7. A display according to claim 5, wherein said liquid crystal medium comprises at least one compound of formula II $$R^2-\text{cyclohexyl}-\phenyl(Y^{21},Y^{22})-CN \quad \text{II}$$

wherein
$R^2$ is alkyl having 1 to 7 carbon atoms, alkoxy having 1 to 7 carbon atoms, alkoxyalkyl having 2 to 7 carbon atoms, alkenyl having 2 to 7 carbon atoms or alkenyloxy having 2 to 7 carbon atoms, and
$Y^{21}$ and $Y^{22}$ are each, independently, H or F.

8. A display according to claim 5, wherein said liquid crystal medium comprises at least one compound of formula III $$R^{31}-(A^{31}-Z^{31}-)_o(-A^{32}-Z^{32}-)_p-A^{33}-Z^{33}-A^{34}-R^{32} \quad \text{III}$$

wherein
$R^{31}$ and $R^{32}$ are each, independently of one another, alkyl having 1 to 7 carbon atoms, alkoxy having 1 to 7 carbon atoms, alkoxyalkyl, having 2 to 7 carbon atoms, alkenyl having 2 to 7 carbon atoms, or alkenyloxy having 2 to 7 carbon atoms, and
$Z^{31}$, $Z^{32}$ and $Z^{33}$ are each, independently of one another, —CH$_2$CH$_2$—, —CH=CH—, —COO— or a single bond, $-A^{31}-$, $-A^{32}-$, $-A^{33}-$ and $-A^{34}-$ are each, independently of one another, cyclohexyl, phenyl, fluorophenyl, difluorophenyl, or pyridyl,

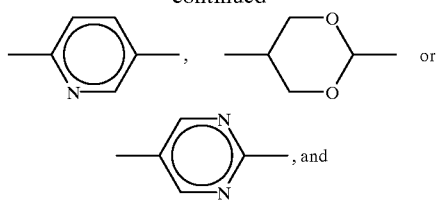

o and p, independently of one another, are 0 or 1.

9. A display according to claim 6, wherein said liquid crystal medium comprises at least one compound of formula III

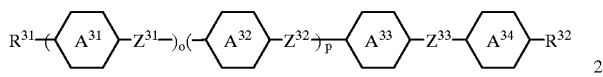

wherein

R$^{31}$ and R$^{32}$ are each, independently of one another, alkyl having 1 to 7 carbon atoms, alkoxy having 1 to 7 carbon atoms, alkoxyalkyl, having 2 to 7 carbon atoms, alkenyl having 2 to 7 carbon atoms, or alkenyloxy having 2 to 7 carbon atoms, and Z$^{31}$, Z$^{32}$ and Z$^{33}$ are each, independently of one another, —CH$_2$CH$_2$—, —CH=CH—, —COO— or a single bond,

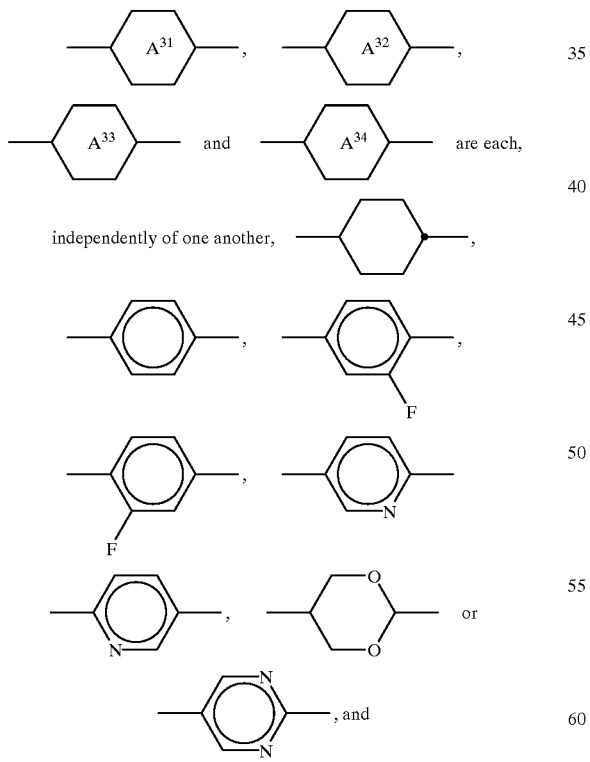

o and p, independently of one another, are 0 or 1.

10. A display according to claim 7, wherein said liquid crystal medium comprises at least one compound of formula III

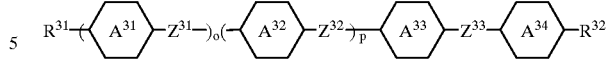

wherein

R$^{31}$ and R$^{32}$ are each, independently of one another, alkyl having 1 to 7 carbon atoms, alkoxy having 1 to 7 carbon atoms, alkoxyalkyl, having 2 to 7 carbon atoms, alkenyl having 2 to 7 carbon atoms, or alkenyloxy having 2 to 7 carbon atoms, and Z$^{31}$, Z$^{32}$ and Z$^{33}$ are each, independently of one another, —CH$_2$CH$_2$—, —CH=CH—, —COO— or a single bond,

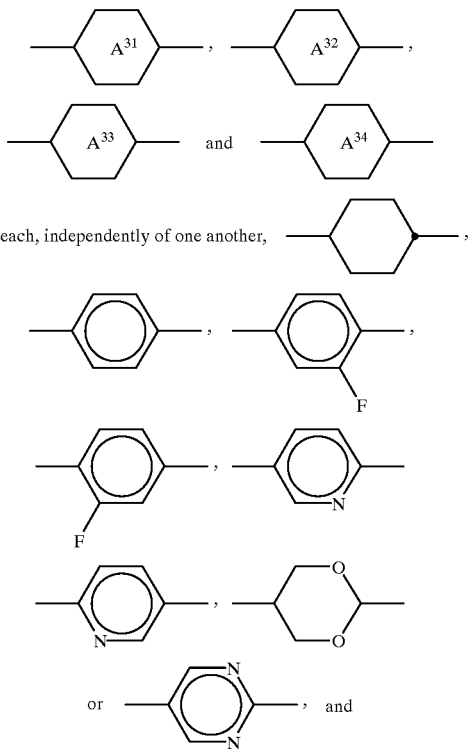

o and p, independently of one another, are 0 or 1.

11. In a method of displaying information using an electro-optical liquid-crystal display, the improvement wherein said display is one in accordance with claim 1.

12. A display according to claim 1, wherein said organic alignment layers are a polyamide layer.

13. A display according to claim 1, wherein said alignment layers each have a layer thickness of 7 nm–80 nm.

14. A display according to claim 1, wherein said alignment layers each have a layer thickness of 8 nm–60 nm.

15. A display according to claim 1, wherein said alignment layers each have a layer thickness of 10 nm–25 nm.

16. A display according to claim 1, wherein said display has a nematic phase range of at least −20° to 70°, a birefringence of 0.100 to 0.180, a threshold voltage of less than or equal to 1.8 V, and a steepness value of the electro-optical characteristic line of less than or equal to 1.100.

17. A display according to claim 1, wherein said alignment layers each have a refractive index of 1.550 to 1.800.

18. A display according to claim 1, wherein said liquid-crystal layer having a surface tilt angle of 3°–150°.

19. An electro-optical liquid-crystal display comprising
a layer of liquid-crystal medium between two substrates with alignment layers on inside surfaces of each of said substrates;
the liquid-crystal layer having a twist angle, from one substrate to the other, of 110°–360°;
the liquid-crystal layer having a surface tilt angle of 2°–20°;
each of said alignment layers having a thickness of 3 nm–150 nm; and
at least one of said alignment layers is an organic layer, and
wherein the difference from 1 of the steepness of the electric-optical characteristic line, represented by the formula $V_{90}/V_{10}-1$, is half or less of the corresponding value of an otherwise identical display in which the layer thicknesses of each of the alignment layers is 100 nm.

20. A display according to claim 19, at least one of said alignment layers has a layer thickness of 4 nm–60 nm.

21. In a method of displaying information using an electro-optical liquid-crystal display, the improvement wherein said display is one in accordance with claim 19.

22. A display according to claim 19, wherein the steepness of the electro-optical characteristic line $V_{90}/V_{10}$ is 1.06 or less.

23. A display according to claim 19, wherein the threshold voltage ($V_{10}$) of the display is 1.20 V or less.

24. A display according to claim 19, wherein said organic alignment layers are a polyamide layer.

25. A display according to claim 19, wherein said alignment layers each have a layer thickness of 7 nm–80 nm.

26. A display according to claim 19, wherein said alignment layers each have a layer thickness of 8 nm–60 nm.

27. A display according to claim 19, wherein said alignment layers each have a layer thickness of 10 nm–25 nm.

28. A display according to claim 19, wherein said display has a nematic phase range of at least –20° to 70°, a birefringence of 0.100 to 0.180, a threshold voltage of less than or equal to 1.8 V, and a steepness value of the electro-optical characteristic line of less than or equal to 1.100.

29. A display according to claim 19, wherein said alignment layers each have a refractive index of 1.550 to 1.800.

30. A display according to claim 19, wherein said liquid-crystal layer having a surface tilt angle of 3°–15°.

31. In a method of displaying information using an electro-optical liquid-crystal display, the improvement wherein said display is one in accordance with claim 19.

32. An electro-optical liquid-crystal display comprising
a layer of liquid-crystal medium between two substrates with alignment layers on inside surfaces of each of said substrates;
the liquid-crystal layer having a twist angle, from one substrate to the other, of 110°–360°;
the liquid-crystal layer having a surface tilt angle of 2°–20°; and
each of said alignment layers having a thickness of 3 nm–150 nm, and
wherein the difference from 1 of the steepness of the electric-optical characteristic line, represented by the formula $V_{90}/V_{10}-1$, is half or less of the corresponding value of an otherwise identical display in which the layer thicknesses of each of the alignment layers is 100 nm.

* * * * *

UNITED STATES PATENT AND TRADEMARK OFFICE
CERTIFICATE OF CORRECTION

PATENT NO. : 6,800,338 B2
DATED : October 5, 2004
INVENTOR(S) : Jacob et al.

It is certified that error appears in the above-identified patent and that said Letters Patent is hereby corrected as shown below:

Column 41,
Line 2, change "150°" to -- 15° --.

Signed and Sealed this

Twelfth Day of April, 2005

JON W. DUDAS
*Director of the United States Patent and Trademark Office*